US007911953B1

(12) United States Patent
Prestor et al.

(10) Patent No.: US 7,911,953 B1
(45) Date of Patent: Mar. 22, 2011

(54) MULTILINK TRAFFIC SHAPING (75) Inventors: Uros Prestor, Union City, CA (US);
Raghu Subramanian, Santa Clara, CA (US); Stephen W. Turner, Menlo Park, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1524 days.

(21) Appl. No.: 11/274,509

(22) Filed: Nov. 16, 2005

(51) Int. Cl.
*G06F 11/00* (2006.01)
(52) U.S. Cl. ......... 370/235; 370/394; 370/437; 370/477
(58) Field of Classification Search ................... 370/229, 370/230.1, 351, 390
See application file for complete search history.

(56) References Cited

U.S. PATENT DOCUMENTS

| | | | | |
|---|---|---|---|---|
| 5,392,280 | A * | 2/1995 | Zheng | 370/353 |
| 6,502,139 | B1 * | 12/2002 | Birk et al. | 709/233 |
| 6,738,351 | B1 * | 5/2004 | Qureshi et al. | 370/235 |
| 6,778,495 | B1 * | 8/2004 | Blair | 370/230 |
| 7,315,900 | B1 * | 1/2008 | Ofelt et al. | 709/238 |
| 7,317,730 | B1 * | 1/2008 | Devanagondi et al. | 370/412 |
| 2004/0032875 | A1 * | 2/2004 | Bly et al. | 370/412 |
| 2004/0208120 | A1 * | 10/2004 | Shenoi | 370/229 |
| 2005/0204252 | A1 * | 9/2005 | Aramaki et al. | 714/748 |
| 2006/0165172 | A1 * | 7/2006 | Koh et al. | 375/240.12 |
| 2006/0239303 | A1 * | 10/2006 | Cho et al. | 370/537 |
| 2008/0155146 | A1 * | 6/2008 | Christensen | 710/104 |

OTHER PUBLICATIONS

Cao, Performance of hashing-based schemes for Internet load balancing: INFOCOM 2000. Nineteenth Annual Joint Conference of the IEEE Computer and Communications Societies. Proceedings. IEEE Publication Date: Mar. 26-30, 2000.*
"Multilink Frame Relay UNI/NNI Implementation Agreement", FRF.16.1, Frame Relay Forum Technical Committee, May 2002, 40 pages.
"Frame Relay Fragmentation Implementation Agreement", FRF.12, Frame Relay Forum, Dec. 1997, 24 pages.
Bormann, C. "The Multi-Class Extension to Multi-Link PPP", Universitaet Bremen TZI, Sep. 1999, http://www.ietf.org/rfc/rfc2686.txt?number=2686, 10 pages.
Sklower et al., "The PPP Multilink Protocol (MP)", Aug. 1996, http://www.ietf.org/rfc/rfc1996.txt?number=1990, 20 pages.

* cited by examiner

*Primary Examiner* — Seema S Rao
*Assistant Examiner* — Henry Baron
(74) *Attorney, Agent, or Firm* — Harrity & Harrity, LLP (57) ABSTRACT

A method for performing multilink communications may include applying a quality-of-service (QoS) policy to incoming traffic, where the QoS policy operates to identify a first portion and a second portion of the incoming traffic. The method may include fragmenting the first portion of the incoming traffic into a group of fragments. The method may include sequencing the group of fragments and the second portion of the incoming traffic into a sequenced flow, where the sequencing causes the second portion to be interleaved among the group of fragments so that the sequenced flow can be made available to a first link and a second link as multilink traffic, where the first link carries a first portion of the multilink traffic and the second link carries a second portion of the multilink traffic.

37 Claims, 4 Drawing Sheets

MULTILINK TRAFFIC SHAPING

FIELD OF THE INVENTION

Implementations consistent with the principles of the invention relate generally to communication networks and, more particularly, to shaping traffic across multiple links without requiring backpressure from an egress interface.

BACKGROUND OF THE INVENTION

Network devices, such as routers, may be configured to distribute incoming traffic received at an ingress interface, or port, across multiple output links associated with an egress interface. Incoming traffic may be distributed across multiple links in order to achieve an output bandwidth that is greater than the bandwidth associated with any one of the multiple links. Multilink networking protocols may be used to facilitate distributing incoming traffic across multiple output links and to facilitate reassembling multilink traffic received at a destination device.

Existing multilink implementations may associate the control of output links with a board, such as an egress interface board, in a manner that does not allow reconfiguration of output links. As a result, network devices may be configured to operate with particular multilink implementations. For example, an egress interface board in a network device may be hardwired with four T1 links that can be used for multilink transmissions. In this example, if one T1 link becomes disabled, the egress interface board may have to operate at a reduced throughput using three T1 links. Reconfiguration of links may be discouraged because a controller on the egress interface board may be aware of only those links physically associated with that board.

Existing implementations may not provide flexibility in selecting links for use in multilink transmission implementations. The lack of flexibility in reconfiguring and/or selecting links for use in multilink implementations may prevent communication networks from operating efficiently.

SUMMARY OF THE INVENTION

In accordance with an implementation, a network device adapted to facilitate multilink communications using multilink traffic is provided. The network device may include a control unit adapted to apply a quality-of-service (QoS) policy to incoming traffic, where the QoS policy associates a first priority with a first portion of incoming traffic and a second priority with a second portion of the incoming traffic. The control unit may be adapted to fragment the second portion of the incoming traffic to produce a group of fragments, and sequence the second portion of the incoming traffic with the first portion of the incoming traffic to produce sequenced traffic. The control unit may be adapted to make a first portion of the sequenced traffic available as a first portion of the multilink traffic, and make a second portion of the sequenced traffic available as a second portion of the multilink traffic.

In accordance with another implementation, a method for performing multilink communications may be provided. The method may include applying a quality-of-service (QoS) policy to incoming traffic, where the QoS policy operates to identify a first portion and a second portion of the incoming traffic. The method may include fragmenting the first portion of the incoming traffic into a group of fragments. The method may include sequencing the group of fragments and the second portion of the incoming traffic into a sequenced flow, where the sequencing causes the second portion to be interleaved among the group of fragments so that the sequenced flow can be made available to a first link and a second link as multilink traffic, where the first link carries a first portion of the multilink traffic and the second link carries a second portion of the multilink traffic.

In accordance with yet another implementation, a system to provide multilink communications is provided. The system may include means for receiving incoming traffic from a network. The system may include means for applying a quality-of-service (QoS) policy to the incoming traffic, where applying the QoS policy takes into account a group of egress links associated as a bundle. The system may include means for fragmenting and sequencing a portion of the incoming traffic to produce a sequenced flow that includes a group of fragments. The system may include means for shaping the sequenced flow in association with the QoS policy to discourage overrunning at least one of a group of egress queues associated with the group of egress links.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention may centralize the control and shaping of multilink traffic. Centralized control may be performed without requiring backpressure from egress interfaces used to make multilink data available to a destination device. Implementations may facilitate bundling substantially any number and/or type of physical links into a multilink path. Incoming traffic may be categorized according to priorities by applying one or more quality of service (QoS) policies thereto. Portions of the prioritized incoming traffic may be fragmented by dividing data units into smaller pieces. Other portions of the prioritized incoming traffic may remain in tact and may be referred to as non-fragmented traffic.

The application of centralized multilink processing and/or control may ensure that QoS policies and/or traffic shaping are performed in a manner that prevents driving physical links, that make up a bundle, beyond the respective bandwidth capacities of those physical links. As a result, dropped multilink fragments may be reduced and/or eliminated. In addition, if a physical link becomes disabled, the centralized multilink processing and/or control may adaptively provide a portion of the multilink traffic to another physical link so that an aggregate multilink bandwidth associated with a bundle is not adversely impacted.

Exemplary System

Figure 1:
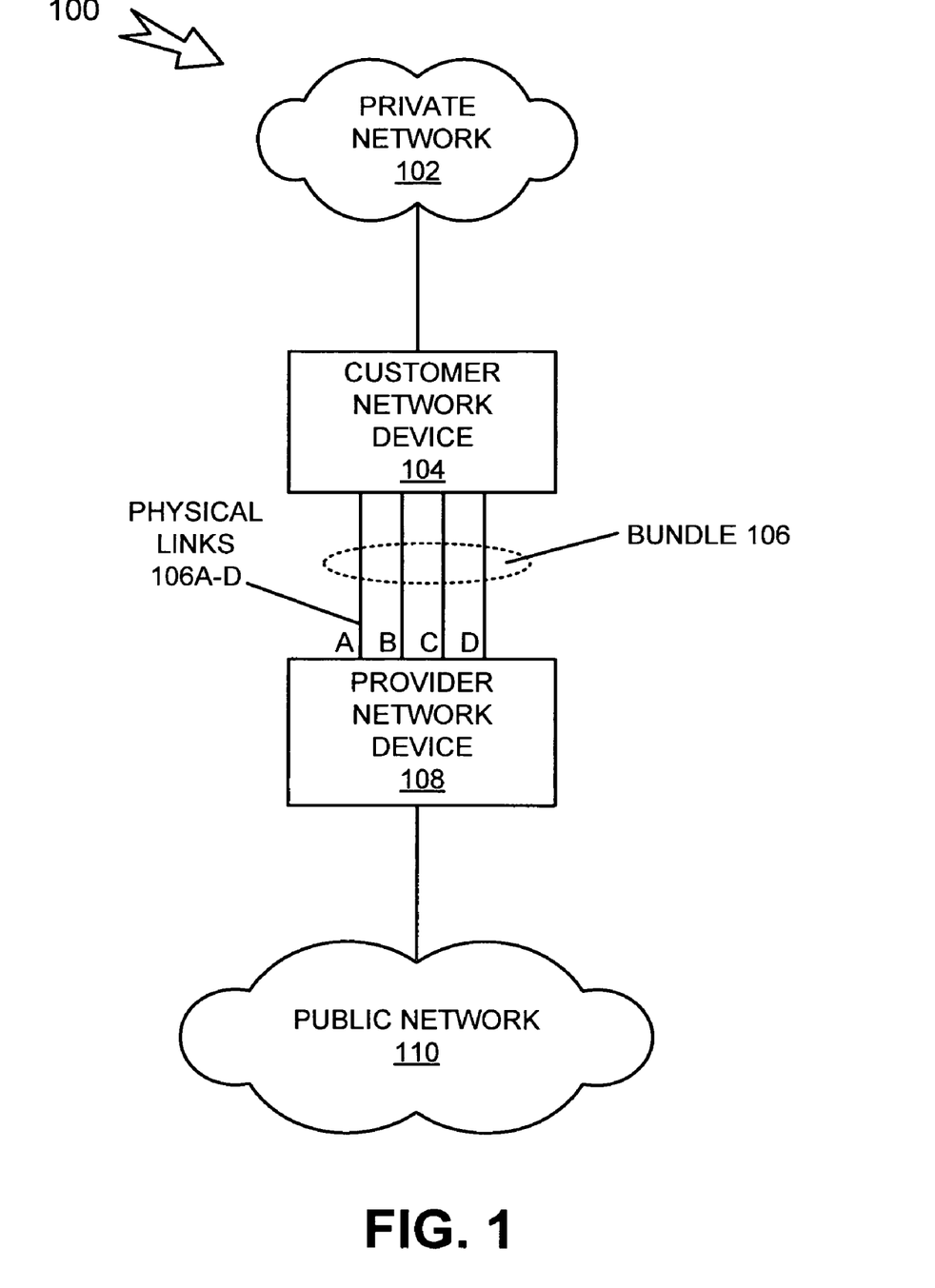
FIG. 1 illustrates an exemplary system adapted to implement multilink communications consistent with the principles of the invention.

FIG. 1 illustrates an exemplary system adapted to implement multilink communications consistent with the principles of the invention. FIG. 1 may include private network 102, customer network device 104 (hereinafter customer device 104), physical links 106A-D, provider network device 108 (hereinafter provider device 108), and public network 110.

Private network 102 may include any network capable of transporting a data unit. For example, private network 102 may be a local area network (LAN), metropolitan area network (MAN) and/or a wide area network (WAN), such as a LAN associated with a corporation, university campus, hospital, and/or a government facility. "Data unit," as used herein, refers to any unit of data that is capable of being transported across a network. Data units may include packet data and/or non-packet data. As such, a data unit is not limited to any particular type of network architecture and/or network protocol.

Customer device 104 may include any device capable of receiving a data unit and/or making the data unit available to an interface, or port, such as an egress interface. Customer device 104 may include a data transfer device, such as, for example, a router, switch, server, and/or firewall, and may be implemented in a standalone configuration and/or a distributed configuration. Customer device 104 may receive data units at an ingress interface and may make the data units available to an egress interface having a number of physical links 106A-D associated therewith. For example, customer device 104 may operate on incoming traffic received via a single link. The received traffic may be operated on to, for example, fragment the traffic. Fragmenting may refer to dividing a large data unit into smaller pieces, referred to as fragments. Customer device 104 may make the fragments available to a number of physical links 106A-D in conjunction with multilink networking protocols. For example, customer device 104 may employ multilink protocols, such as point-to-point (PPP) protocol (RFC 1990), multi-class extension to multi-link PPP (RFC 2686), frame relay fragmentation implementation agreement (FRF 12), and/or multilink frame-relay user-to-network interface (UNI)/network-to-user interface (NNI) implementation agreement (FRF 16).

Physical links 106A-D may include any device, technique and/or structure capable of conveying a data unit from a source location to a destination location. Links 106A-D may include optical fibers, conductors, and/or free-space links such as optical and/or radio frequency (RF) links. Physical links 106A-D may be associated into a virtual group that is herein referred to as bundle 106. Physical links 106A-D may be bi-directional and may carry traffic from customer device 104 to provider device 108 and/or may carry traffic from provider device 108 to customer device 104. While shown as direct links between customer device 104 and provider device 108, links 106A-D may be virtual links carried, for example, over a network.

Bundle 106 may be used to aggregate data associated with a number of physical links into a single bundle of bandwidth. For example, if each physical link 106A-D is capable of carrying 1 Mbit/sec of traffic, bundle 106 may provide 4 Mbit/sec to a destination device, such as provider device 108. The traffic rate provided by bundle 106 may be on the order of the sum of the bandwidths of the physical links 106A-D making up bundle 106. Bundle 106 may be formed from substantially any number and/or type of physical links. Customer device 104 may employ multilink protocols to fragment incoming traffic. Customer device 104 may sequence fragmented traffic across physical links 106A-D making up bundle 106.

Provider device 108 may include any device capable of receiving multilink traffic. Provider device 108 may include a data transfer device, such as a router, switch, gateway, server and/or firewall. Provider device 108 may receive multilink traffic via substantially any number and/or type of physical links 106A-D. Provider device 108 may reassemble multilink traffic received via a number of physical links 106A-D into a format adapted for transmission on a single link. Provider device 108 may be associated with a service provider and may operate to make customer data available to a public network 110. Provider device 108 may also make multilink traffic available to customer device 104 via physical links 106A-D.

Public network 110 may include any network capable of carrying a data unit from a source to a destination. Public network 110 may employ one or more network protocols and may transport data via hardwired links and/or wireless links. For example, public network 110 may include a WAN, such as the Internet, a switched network, such as the public switched telephone network (PSTN), or the like.

Exemplary Functional Diagram

Figure 2:
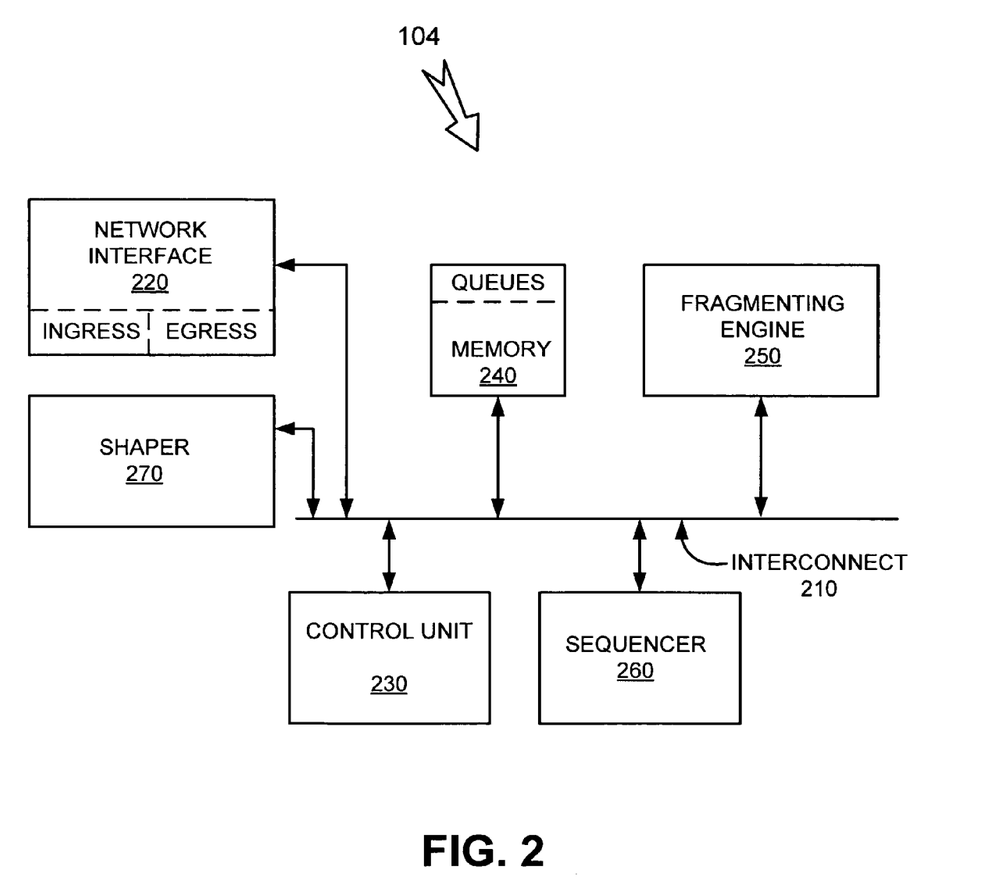
FIG. 2 illustrates a functional block diagram that may be used to implement multilink communication techniques in a network device, such as customer device 104, consistent with the principles of the invention.

FIG. 2 illustrates a functional block diagram that may be used to implement multilink communication techniques in a network device, such as customer device 104, consistent with the principles of the invention. The functional block diagram of FIG. 2 may include an interconnect 210, a network interface 220, a control unit 230, a memory 240, a fragmenting engine 250, a sequencer 260, and a shaper 270.

The functional block diagram of FIG. 2 illustrates discrete components performing operations described below. It may be possible for one of the components to incorporate functionality associated with another one or more of the components. For example, control unit 230 may be configured to include the functionality of fragmenting engine 250, sequencer 260 and/or shaper 270. Implementations of customer device 104 may be deployed in, for example, a board based configuration where the boards are retained in slots associated with a chassis. Furthermore, the components of FIG. 2 may be implemented in hardware and/or software consistent with the principles of the invention.

Interconnect 210 may include one or more communication paths that permit communication among the components of customer device 104.

Network interface 220 may include any device capable of receiving a data unit from a network and/or making a data unit available to a network. Network interface 220 may include an ingress port to receive data units from a network and/or an egress port to make data units available to a network. The egress port may operate to make fragmented data units available to a number of physical links 106A-D, possibly operating as a bundle 106.

Control unit 230 may include any type of processor or microprocessor, and may interpret and execute instructions. Control unit 230 may be implemented in a standalone configuration and/or in a distributed configuration, such as in a parallel processing implementation. Control unit 230 may operate to provide centralized control to the components of customer device 104 to facilitate efficient communication with a destination device via bundle 106. Control unit 230 may be implemented as an application specific integrated circuit (ASIC) configured to control operation of customer device 104. Control unit 230 may use QoS policies to determine which data units should be fragmented and/or which data units should be sent on a particular physical link 106A-D.

Memory 240 may include a random access memory (RAM) or another type of dynamic storage device that stores information and instructions for execution by control unit 230. Memory 240 may also be used to store temporary variables or other intermediate information during execution of instructions by control unit 230. Memory 240 may be used for storing information, such as QoS policies, fragmentation lists, parameters used by shaper 270, and/or parameters associated with physical links 106A-D.

Memory 240 may include one or more queues that may be used to facilitate multilink communications. For example, memory 240 may include one or more ingress queues for use on traffic received from private network 120. For example, memory 240 may include a strict high priority, a high priority, and/or a low priority queue for use with incoming traffic. Memory 240 may also include one or more egress queues. For example, memory 240 may operate a first queue adapted to hold fragmented traffic and a second queue adapted to hold non-fragmented traffic prior to transmission to provider device 108 via bundle 106. Memory 240 may also operate queues associated with respective ones of physical links 106A-D. Memory 240 may operate in cooperation with data storage devices, such as a magnetic disk or optical disk and its corresponding drive and/or some other type of magnetic or optical recording medium and its corresponding drive for storing information and/or instructions.

Fragmenting engine 250 may include any device and/or technique capable of fragmenting an incoming data unit into a number of pieces for transmission via bundle 106. For example, fragmenting engine 250 may receive incoming traffic that is to be fragmented. Fragmenting engine 250 may split an incoming data unit into a number of fragments. Fragmenting engine 250 may operate with a fragmenting list, or index, to maintain information about fragments. Fragmenting engine 250 may operate in conjunction with one or more QoS policies when fragmenting data units to ensure that traffic is handled according to predetermined criteria with respect to priorities. Fragmenting engine 250 may receive data from an input queue and may make the fragmented data available to sequencer 260 and/or one or more output queues.

Sequencer 260 may include any device and/or technique for sequencing fragmented traffic and/or non-fragmented traffic. For example, sequencer 260 may operate on delay sensitive traffic, such as voice and/or video data, that has not been fragmented as well as operating on lower priority traffic, such as text data, that has been fragmented. Sequencer 260 may interleave data units, such as packets, of delay sensitive traffic with fragments of lower priority data units to efficiently use individual link bandwidths and/or bundle bandwidth. Sequencer 260 may operate in conjunction with one or more QoS policies to perform load balancing across physical links 106A-D. For example, sequencer 260 and/or a QoS policy may perform link based, bundle based, hash based, and/or byte-wise load balancing across physical links 106A-D. Sequencer 260 may encapsulate data to facilitate error detection and/or transmission of sequenced traffic to a destination device, such as provider device 108.

Sequencer 260 may receive non-fragmented traffic, such as voice, directly from a device implementing QoS policies on incoming traffic and/or sequencer 260 may receive fragmented traffic from fragmenting engine 250. Sequencer 260 may assign consecutive sequence numbers to fragments associated with fragmented traffic Sequencer 260 may interleave non-fragmented data units with fragments to facilitate timely delivery of non-fragmented data units. Sequencer 260 may also encapsulate fragments with multilink headers. Sequencer 260 may choose a physical link 106A-D for each fragment and/or non-fragmented data unit in a manner that maintains link utilizations and/or bundle utilizations at a determined rate.

Sequencer 260 may be configured to compress fragments and/or non-fragmented data units to reduce bandwidth demands. Compression may reduce the bandwidth required to send a particular stream of multilink traffic as compared to the size of the stream if compression were not employed. Sequencer 260 may employ tokens and/or other counting devices to inform control unit 230 that compression has freed up additional bandwidth that may be used for subsequent traffic. For example, a bandwidth reduction value may be associated with an amount of bandwidth freed up thorough the use of compression techniques and tokens may be used to represent the bandwidth reduction value. The tokens may be sent from sequencer 260 to control unit 230 for use in managing incoming traffic.

Sequencer 260 may operate in conjunction with one or more output queues that may be used to make non-fragmented data units and/or fragments available to bundle 106. For example, sequencer 260 may operate with a first queue for holding non-fragmented data units and a second queue for holding data units that have been fragmented.

Shaper 270 may include any device and/or technique for shaping a traffic flow. Shaper 270 may operate in conjunction with sequencer 260 and/or control unit 230 to shape fragmented and/or non-fragmented data units that are made available to bundle 106. Shaper 270 may be configured to shape outgoing traffic in a manner that does not exceed a bundle bandwidth. Shaper 270 may be adapted via an operator input and/or system inputs to facilitate adjustment of an output bandwidth in order to minimize and/or eliminate dropped data units and/or fragments.

Settings associated with shaper 270 may be determined via network measurements, modeling, and/or rules of thumb, such as estimates. For example, test data may be sent from customer device 104 to provider device 108 via bundle 106. Provider device 108 may determine that certain fragments of test data were dropped (i.e., were not received at provider device 108). Provider device 108 may make dropped fragment determinations available to customer device 104 and/or an operator associated therewith. Shaper 270 may be adjusted based on the measured fragments to eliminate dropped fragments. In certain situations, it may be desirable to set shaper 270 so that less than one hundred percent of the bundle bandwidth is used in order to prevent dropped fragments. Shaper 270 may monitor queues, such as egress queues, and may shape traffic based on the monitoring. Shaper 270 may take into account both the size of incoming traffic and processing overhead, such as multilink headers and/or bits associated with bit stuffing, when shaping traffic.

Customer device 104 may implement the functions described below in response to control unit 230 executing software instructions contained in a computer-readable medium, such as memory 240. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Implementation

Figure 3:
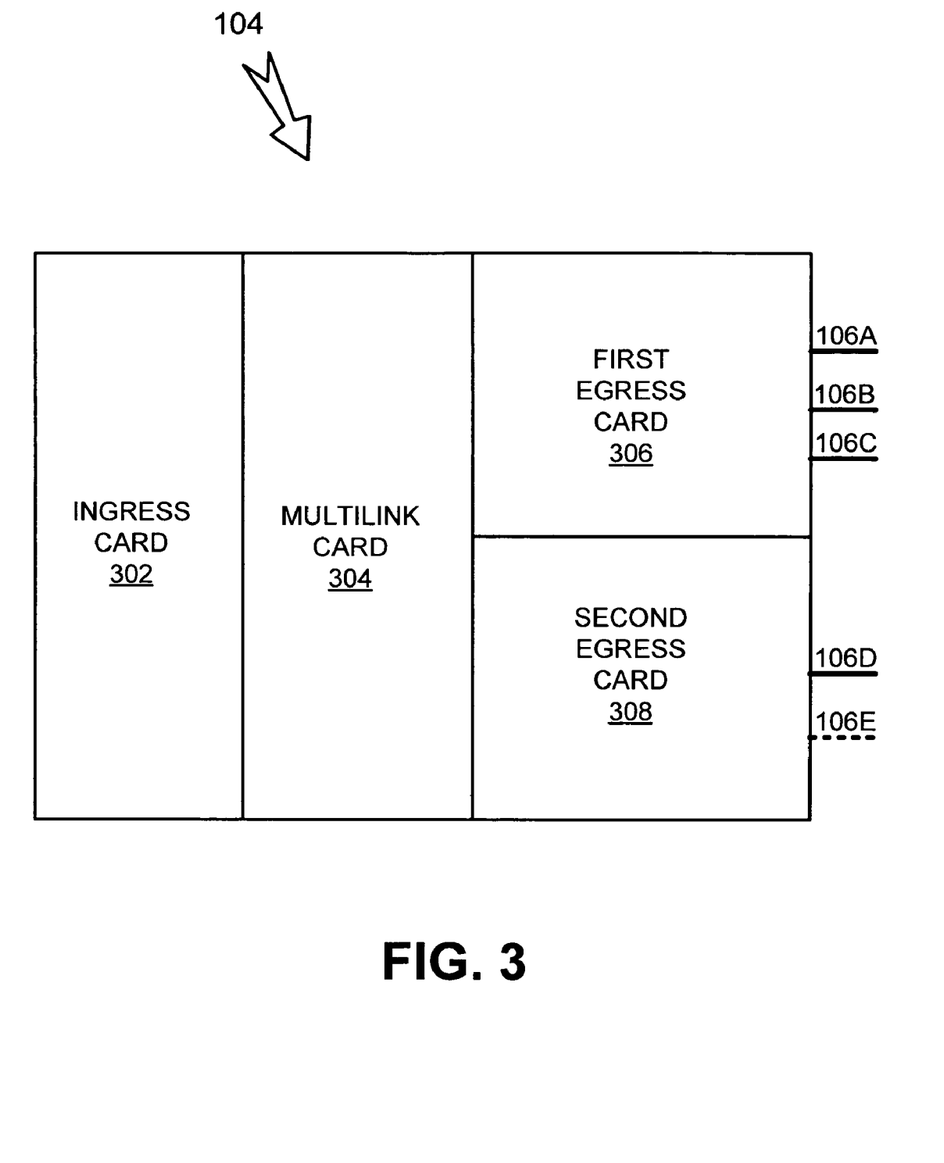
FIG. 3 illustrates an exemplary configuration of a network device that may be configured to perform multilink communication via card based components supported in a chassis consistent with the principles of the invention.

FIG. 3 illustrates an exemplary configuration of a network device that may be configured to perform multilink communication via card based components supported in a chassis consistent with the principles of the invention. Card based implementations of customer device 104 may facilitate scaling via the addition or removal of cards from customer device 104. For example, physical interface cards (PICs) may be adapted for use in customer device 104 to provide multilink capabilities. Customer device 104 (FIG. 3) may include an ingress card 302, a multilink card 304, a first egress card 306, and a second egress card 308.

Ingress card 302 may include any device and/or component capable of receiving data units from a network. Ingress card 302 may include functionality associated with network interface 220 to provide incoming data units to multilink card 304. Incoming data units may be associated with, for example, strict-high priority traffic, such as voice and/or video data, high priority traffic, such as time sensitive data, and/or low priority traffic, such as text data. Ingress card 302 may be configured to decrypt and/or decompress incoming traffic as needed.

Multilink card 304 may include any device and/or component capable of facilitating multilink communication in a network. Multilink card 304 may include one or more control units 230 adapted to perform operations, such as performing per bundle QoS, multilink fragmentation and/or reassembly, estimating traffic in an egress queue associated with an egress link, and/or scheduling of fragmented and/or non-fragmented traffic using a per bundle scheduling map.

The use of multilink card 304 may allow ingress card 302, first egress card 306, and/or second egress cards 308 to be less sophisticated and/or costly than if control unit functionality were distributed onto ingress card 302 and/or egress cards 306, 308. For example, QoS policies, fragmentation, and/or sequencing may be performed in a centralized location via multilink card 304 as opposed to performing these functions locally on other cards, such as egress cards 306, 308. Multilink card 304 may perform QoS shaping by, for example, associating a first portion of multilink traffic with a first link and a second portion of multilink traffic with a second link using a per bundle scheduling map.

QoS policies and/or traffic shaping may take into account the number of egress links, the type of egress links, and/or the throughput capabilities associated with egress queues and/or links individually and/or as a bundle. Egress links may have one or more queues associated therewith that may have a corresponding transmit rate, buffer size, and/or a priority associated therewith. For example, a QoS policy may operate to associate a first priority with a first portion of multilink traffic and a second priority with a second portion of multilink traffic. The first portion of multilink traffic may be associated with a first egress link in accordance with a first bandwidth capability of the first egress link and the second portion may be associated with a second egress link in accordance with a second bandwidth capability associated with the second link. The QoS policy may implement per link, per byte and/or per bundle load balancing via the association of priorities to portions of the incoming traffic.

QoS policies and/or traffic shaping may use a transmit rate to dynamically adjust the operation of a device to match an available bundle capacity. If the available bundle capacity is insufficient, rates, such as absolute rates, may be scaled down until adequate bundle capacity is available. Implementations may use a scale-down ratio to facilitate bandwidth adjustments. The scale-down ratio may be represented as a fraction of the available bundle bandwidth divided by the sum of all absolute rates.

Multilink card 304 may apply QoS as a weighted round robin to egress queues associated with a bundle. Multilink card 304 may apply QoS at the bundle level to avoid overrunning queues associated with physical links 106A-D. For example, a queue associated with strict-high priority traffic may be emptied before traffic in queues associated with lower priority traffic are emptied. QoS may also cause traffic associated with a particular flow to be routed to a single physical link 106A, B, C, or D.

A centralized controller, such as multilink card 304, may allow first and second egress cards 306, 308 to be managed in concert to ensure efficient use of bundle bandwidth. For example, multilink card 304 may perform byte-wise load balancing for physical links 106A-D. Byte-wise load balancing may determine which link has the least amount of traffic queued, and that link may be selected to receive a next byte. Multilink card 304 may also perform hash based load balancing by computing a hash value that may be based, for example, on a source address, a destination address, and/or one or more multi-protocol label switching (MPLS) labels. The resulting hash value may be used to select an active physical link 106A-D within bundle 106. Implementations employing load balancing may operate in a manner that prevents egress queues, such as those associated with physical links 106A-D, from being overrun.

Multilink card 304 may adaptively reconfigure first egress card 306 and/or second egress card 308 based on bandwidth needs and/or equipment availability. For example, assume that physical link 106B becomes disabled. Multilink card 304 may reallocate traffic from an egress queue associated with physical link 106B, on first egress card 306, with a new link 106E, on second egress card 308. New link 106E may carry traffic previously carried by physical link 106B so that bundle bandwidth is not adversely impacted.

In one implementation, multilink card 304 may not receive feedback, such as backpressure, from first egress card 306 and/or second egress card 308 regarding the status of egress queues associated with physical links 106A-D. Therefore, multilink card 304 may use estimates and/or known values for egress queue throughputs associated with physical links 106A-D so that egress queues are not overrun. Multilink card 304 may apply estimates at a bundle level if desired.

First egress card 306 and second egress card 308 may include any device and/or component capable of making a data unit available to another device and/or network. Egress cards 306, 308 may include functionality associated with network interface 220 and may receive fragmented data units and non-fragmented data units from multilink card 304. Egress cards 306, 308 may include at least one egress queue associated with each physical link 106A-D used in bundle 106. Egress queues may be configured to allow higher priority data units to be inserted ahead of lower priority data units and/or data unit fragments. Egress queues may be collectively associated as a bundled queue.

Figure 4:
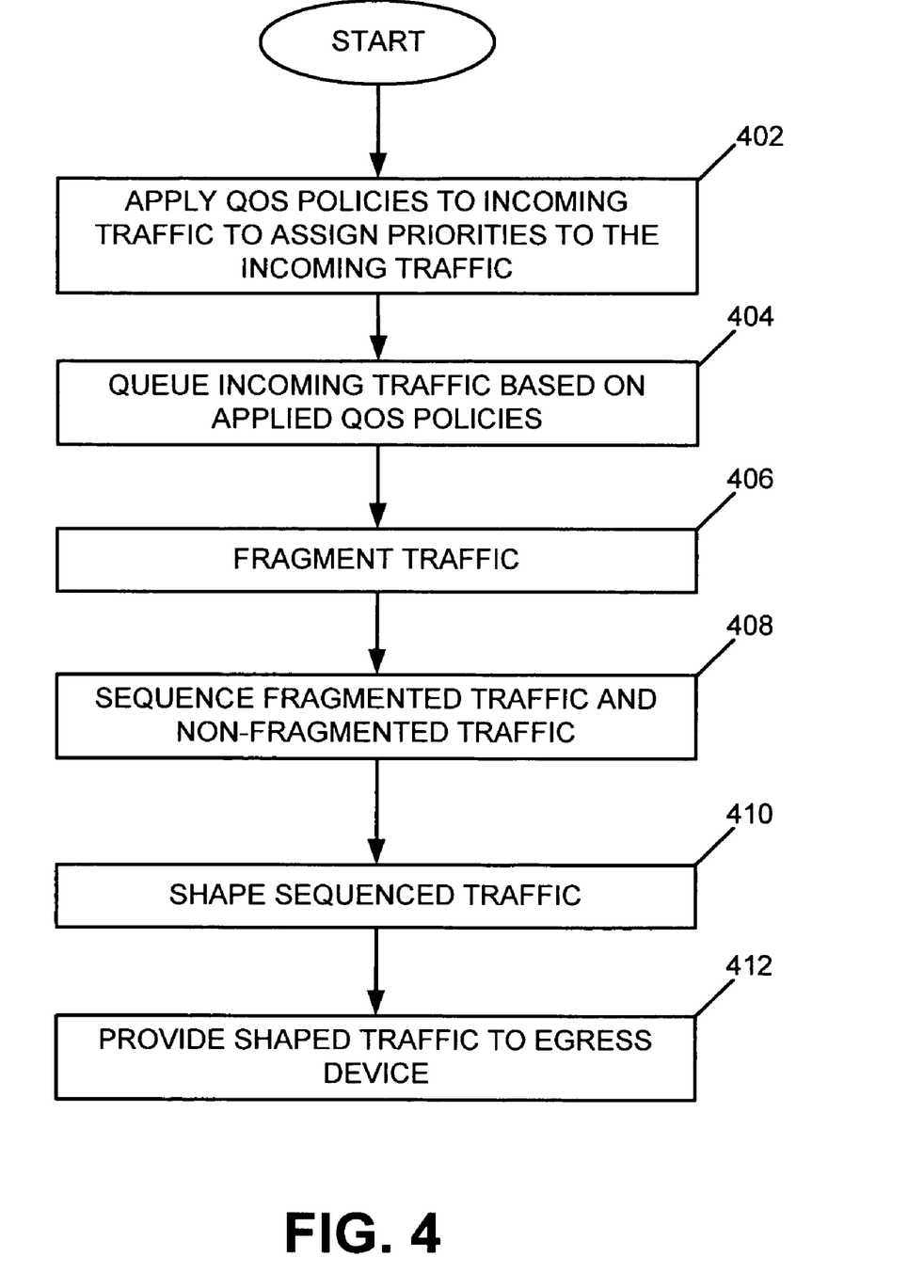
FIG. 4 illustrates an exemplary method for implementing multilink communication techniques consistent with the principles of the invention.

FIG. 4 illustrates an exemplary method for implementing multilink communication techniques consistent with the principles of the invention. By way of example, incoming traffic may include voice traffic and data traffic. Voice traffic may include delay-sensitive traffic that cannot tolerate transmission delays in going from customer device 104 to provider device 108. In contrast, data traffic may be able to tolerate transmission delays in going from customer device 104 to provider device 108. Customer device 104 may be configured to operate on voice traffic in a manner that prevents it from incurring undesirable delays when being conveyed from customer device 104 to provider device 108.

When incoming traffic is received at customer device 104, the incoming traffic may be prioritized. For example, voice traffic may be given a first priority, such as a strict-high priority, and data traffic may be given a priority lower than the first priority. Strict-high priority may identify traffic that cannot tolerate delays, while the lower priority associated with data traffic may indicate that data traffic can tolerate delays.

One or more QoS policies may be applied to the incoming traffic to assign priorities to the incoming traffic (act 402). For example, a QoS policy may dictate that voice traffic should be transferred from customer device 104 to provider device 108 in a manner that prevents the voice traffic from being delayed. The applied QoS policy may further dictate that data traffic can be handled in a way that facilitates transfer from customer device 104 to provider device 108 using techniques that can lead to some delay, such as by breaking data traffic into smaller pieces before transferring the data traffic from customer device 104 to provider device 108.

A QoS policy may take into account aspects of customer device 104 and/or aspects of provider device 108 when applying policies to queued traffic. For example, the QoS policy may take into account the bandwidth of egress links coupling customer device 104 to provider device 108. Egress links coupling customer device 104 and provider device 108 may be accounted for individually or as a logical group, such as a bundle. For example, the QoS policy may take into account a first throughput rate associated with a first egress link and a second throughput associated with a second egress link. A QoS policy that is applied to the voice traffic and/or data traffic in conjunction with egress links that are treated as a bundle may be referred to as a per-bundle QoS policy. A per bundle QoS policy may refer to an aggregate throughput for egress links included in the bundle. Treating egress links as a bundle may facilitate more efficient operation of customer device 104 since substantially all egress links associated with customer device 104 may be run at their maximum bandwidths to achieve an aggregate throughput associated with the bundle.

Incoming traffic may be queued according to the one or more applied QoS policies (act 404). For example, voice traffic and data traffic may be associated with an input queue where the voice and data traffic are arranged in the queue according to the assigned priorities. The QoS policy may cause voice traffic to be arranged in the queue so as to exit the queue before some or all of the data traffic.

Queuing of traffic and the application of QoS policies to incoming traffic may operate to designate incoming traffic into two groups. For example voice traffic may be designated as traffic that should not be fragmented (e.g., traffic that should be transmitted intact), while data traffic may be designated as traffic that can be fragmented (e.g., traffic that can be divided into smaller units).

Traffic that can be fragmented may be fragmented into smaller units, referred to as fragments (act 406). For example, fragmenting engine 250 may divide data traffic into fragments before making them available to another device, such as sequencer 260. Fragments may facilitate load balancing by providing small pieces of data that can be spread across egress links in a manner that provides for more controlled bandwidth management than can be accomplished via entire data units, such as would be the case if data traffic were not fragmented.

The fragmented traffic and the nonfragmented traffic may be sequenced (act 408). For example, sequence numbers may be associated with each fragment via sequencer 260. Sequencer 260 may sequence fragmented traffic and/or non-fragmented traffic by interleaving the fragmented traffic and non-fragmented traffic. For example, sequencer 260 may interleave the non-fragmented voice traffic with fragments formed from data traffic. The sequencing operation may allow interleaved traffic to be spread across multiple egress links, such as physical links 106A-D, in a manner that facilitates efficient use of the individual bandwidths associated with the egress links as well as a bandwidth associated with a bundle formed by the virtual grouping of the egress links. Also, non-fragmented voice traffic may be interleaved with fragments of data traffic so as to ensure that voice traffic is not delayed when being transferred from customer device 104 to provider device 108.

To facilitate the tracking of fragments in the fragmented traffic, sequencer 260 may assign sequence numbers to the traffic. The sequence numbers may facilitate the reassembly of the traffic. The sequenced traffic may be shaped according to centralized QoS policies implemented by control unit 230 (act 410). For example, interleaved traffic may be shaped so as not to exceed individual link bandwidths and/or a bundle bandwidth. For example, an egress link may have an egress queue associated therewith. Interleaved traffic may be shaped so as not to exceed a throughput capability of the egress queue. As a result, an egress queue may be able to operate without providing feedback, or backpressure, to control unit 230.

Shaped traffic may be provided to an egress device, such as first egress board 306, in conjunction with making multilink traffic available to a destination, such as provider device 108 (act 412). The egress device may include a number of egress queues that may be associated with a number of egress links, such as physical links 106A-D. The egress device may associate interleaved traffic, received from sequencer 260, with one or more egress queues based on criteria from the QoS policies. For example, QoS policies associated with voice traffic may dictate that other types of lower priority traffic, such as data traffic fragments, be sent after the voice traffic so as not to delay voice traffic.

Shaped traffic may be made available to egress queues in a manner that facilitates maintaining QoS priorities for traffic residing in the queues. For example, voice traffic may be provided to an egress queue in a manner that makes it leave the queue prior to a fragment of data traffic. In addition, fragments may be placed in the egress queue in a manner that causes them to exit the queue after voice traffic. In certain implementations, an egress queue may not be capable of providing feedback, or backpressure, to control unit 230 regarding a status of the egress queue. Implementations where an egress queue may not be capable of providing feedback may include, for example, implementations where control unit 230 is on a first card and the egress queue is on a second card, where both cards may operate in a device, such as customer device 104.

Control unit 230 may employ techniques for performing load balancing across egress links without requiring feedback information from egress queues and/or egress links, such as the status of a current fill rate associated with the egress queue. Control unit 230 may apply load balancing techniques at the link level and/or at a bundle level. Load balancing techniques may include balancing traffic according to increments of traffic, such as by packet, byte, fragment, etc. Increments used for balancing traffic can be substantially any size. In one implementation, byte-wise load balancing may be employed to shape traffic associated with an egress queue. Shaped traffic may be made available to a destination, such as provider device 108, as multilink traffic via a number of egress links, such as physical links 106A-D.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts have been described with respect to FIG. 4, the order of the acts may be varied in other implementations consistent with the invention. Moreover, non-dependent acts may be implemented in parallel.

No element, act, instruction, or signal flow used in the description of the application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A network device to facilitate multilink communications using multilink traffic, the network device comprising:
   a control unit to:
      apply a quality-of-service (QoS) policy to incoming traffic, where the QoS policy associates a first priority with a first portion of incoming traffic and a second priority with a second portion of the incoming traffic;
      fragment one of the first portion or the second portion of the incoming traffic, based on which of the first portion or the second portion has a higher priority, to produce a plurality of fragments;
      associate a sequence number with each the plurality of fragments;
      sequence, based on the sequence numbers, the fragmented one of the first portion or the second portion of the incoming traffic with a non-fragmented portion of the incoming traffic to produce sequenced traffic; and
      make a first portion of the sequenced traffic available as a first portion of the multilink traffic, and make a second portion of the sequenced traffic available as a second portion of the multilink traffic.

2. The network device of claim 1, where the control unit is further to:
   shape the sequenced traffic to produce shaped traffic.

3. The network device of claim 1, further comprising:
   an egress interface to facilitate outputting of the multilink traffic; and
   a chassis to removeably support a first card for supporting the egress interface and a second card for supporting the control unit.

4. The network device of claim 1, further comprising:
   an egress interface including an egress queue, where the egress interface is to receive the first portion and second portion of the sequenced traffic and provide no information to the control unit regarding a status of the egress queue.

5. The network device of claim 4, where the egress interface operates with a first link and a second link and where the QoS policy associates the first link with the first portion of the multilink traffic and the second link with the second portion of the multilink traffic.

6. The network device of claim 5, where the first link has a first throughput rate and the second link has a second throughput rate and where the QoS policy takes into account the first throughput rate and the second throughput rate when applying the QoS policy to the first portion and second portion of the multilink traffic.

7. The network device of claim 1, where the first priority and the second priority are selected from a group of priorities by the QoS policy.

8. The network device of claim 7, where the group of priorities includes the first priority, the second priority and a third priority, where the first priority is higher than the second priority and where the second priority is higher than the third priority.

9. The network device of claim 8, where members of the group of priorities are used in conjunction with the QoS policy to determine if the first portion of the incoming traffic or the second portion of the incoming traffic should be fragmented.

10. The network device of claim 1, where one of the first portion or the second portion of incoming traffic includes voice data units or video data units.

11. The network device of claim 1, where the QoS policy operates to perform load balancing across a first link that is associated with the first portion of the multilink traffic and a second link that is associated with the second portion of the multilink traffic.

12. The network device of claim 11, where the load balancing takes into account a transmit rate, a buffer size, or a link priority associated with the first link or the second link.

13. The network device of claim 1, where a first link is associated with the first portion of multilink traffic and a second link is associated with the second portion of multilink traffic and where the QoS policy implements byte-wise load balancing across the first link and the second link.

14. The network device of claim 1, where a first link is associated with the first portion of multilink traffic and a second link is associated with the second portion of multilink traffic and where the QoS policy uses hash based load balancing to produce a hash value that is used to select one of the first link or the second link.

15. The network device of claim 1, where a first link is associated with the first portion of multilink traffic and a second link is associated with the second portion of multilink traffic, where the first link and the second link are associated as a bundle that is used in conjunction with the QoS policy to produce an estimate that is used to associate the first priority with the first portion of the incoming traffic and the second priority with the second portion of the incoming traffic.

16. The network device of claim 1, where a first link is associated with the first portion of multilink traffic and a second link is associated with the second portion of multilink traffic, and where the first link has a first egress queue that is emptied based on the QoS policy and where the second link has a second egress queue that is emptied based on the QoS policy.

17. The network device of claim 1, where the control unit associates sequence numbers with respective members of the plurality of fragments.

18. The network device of claim 1, where members of the plurality of fragments have multilink headers associated therewith.

19. The network device of claim 1, where the plurality of fragments are compressed to reduce a size of the plurality of fragments from a first length to a second length, where a difference between the first length and the second length is referred to as a bandwidth reduction value, and where the bandwidth reduction value is used by the control unit to handle subsequent incoming traffic in a manner that uses an additional amount of bandwidth that is substantially equal to the bandwidth reduction value.

20. The network device of claim 19, where a token is associated with the bandwidth reduction value.

21. The network device of claim 2, further comprising:
a first egress queue associated with the first portion of the multilink traffic, where the first egress queue is to receive shaped traffic in a manner that discourages overrunning the first egress queue; and
a second egress queue associated with the second portion of the multilink traffic, where the second egress queue is to receive shaped traffic in a manner that discourages overrunning the second egress queue.

22. The network device of claim 21, where a shaped traffic rate is associated with the shaped traffic, and where the shaped traffic rate is adjustable by an operator or a system.

23. The network device of claim 21, where the first egress queue, or the second egress queue are monitored in conjunction with producing the shaped traffic.

24. The network device of claim 21, where a first link is associated with the first egress queue and a second link is associated with the second egress queue, and where the first link and the second link are logically associated as a bundle having a bundle bandwidth that includes a first bandwidth associated with the first link and a second bandwidth associated with the second link, and where shaping the sequenced traffic takes the bundle bandwidth into account.

25. The network device of claim 1, where the control unit is further to form a third portion of the multilink traffic from a third portion of the sequenced traffic; and
where the network device further comprises:
a first egress interface to associate the first portion of the multilink traffic with a first link and to associate the second portion of the multilink traffic with a second link; and
a second egress interface to associate the third portion of the multilink traffic with a third link.

26. The network device of claim 25, where the control unit allocates a portion of the first portion of the multilink traffic from the first link to the third link.

27. The network device of claim 26, where the allocation is performed in response to a problem with the first link, a need for a greater aggregate bandwidth that is collectively formed by a first bandwidth associated with the first link and a second bandwidth associated with the second link, or to accommodate at least one of a first priority traffic, a second priority traffic, or a third priority traffic where the first priority is higher than the second priority and the second priority is higher than the third priority.

28. A control unit-implemented method for performing multilink communications, the method comprising:
applying, using the control unit, a quality-of-service (QoS) policy to incoming traffic, where the QoS policy operates to identify a first portion and a second portion of the incoming traffic, where the first portion has a first priority and the second portion has a second, different priority;
fragmenting, using the control unit, the first portion of the incoming traffic into a plurality of fragments, without fragmenting the second portion;
associating a sequence number with a fragment of the plurality of fragments, where the sequence number facilitates identification of the fragment of the plurality of fragments; and
sequencing, using a processor and based on the sequence number, the plurality of fragments and the non-fragmented second portion of the incoming traffic into a sequenced flow, where the sequencing causes the non-fragmented second portion to be interleaved among the plurality of fragments so that the sequenced flow is to be made available to a first link and a second link as multilink traffic, where the first link carries a first portion of the multilink traffic and the second link carries a second portion of the multilink traffic.

29. The control unit-implemented method of claim 28, further comprising:
shaping the sequenced flow based on a bundle bandwidth that is formed by a logical association of a first bandwidth associated with the first link and a second bandwidth associated with the second link.

30. The control unit-implemented method of claim 28, further comprising:
shaping the sequenced flow to discourage overrunning a first queue associated with the first link or a second queue associated with the second link.

31. The control unit-implemented method of claim 28, further comprising:
shaping the sequenced flow based on an operator input or a system input, where the operator input or the system input operates to adapt a shaping rate to discourage dropping one or more of the plurality of fragments.

32. The control unit-implemented method of claim 28, further comprising:
shaping the sequenced flow, where the shaping takes into account a traffic rate and overhead associated with shaping traffic.

33. The control unit-implemented method of claim 28, further comprising:
performing load balancing across the first link and the second link.

34. The control unit-implemented method of claim 28, further comprising:
associating the first link and the second link together as a bundle; and
performing byte-wise load balancing across links included in the bundle.

35. The control unit-implemented method of claim 28, further comprising:
performing hash-based load balancing across the first link and the second link.

36. The control unit-implemented method of claim 28, further comprising:
making the sequenced flow available to a card that supports an egress interface that is operatively coupled to the first link or the second link.

37. A system to provide multilink communications, comprising:
means for receiving incoming traffic from a network;
means for applying a quality-of-service (QoS) policy to the incoming traffic, where applying the QoS policy takes into account a plurality of egress links logically associated as a bundle and results in the incoming traffic being divided into two portions, where each portion has a different priority level;
means for fragmenting the portion of the incoming traffic that has a lower priority level and interleaving the fragmented portion of the incoming traffic with another, non-fragmented, portion of the incoming traffic, having a higher priority level, to produce a sequenced flow;

means for associating a sequence number with a fragment of the plurality of fragments, where the sequence number facilitates identification of the fragment of the plurality of fragments; and means for shaping the sequenced flow, based on the sequence number, and in association with the QoS policy, to discourage overrunning at least one of a plurality of egress queues associated with the bundle.

* * * * *